United States Patent [19]

Lindenberger et al.

[11] 4,396,405
[45] Aug. 2, 1983

[54] PAINT SPRAY BOOTH EMISSIONS CONTROL PROCESS

[75] Inventors: William H. Lindenberger, Naperville; Theodore P. Sieder; Edwin C. Zuerner, Jr., both of Bolingbrook, all of Ill.

[73] Assignee: Nalco Chemical Company, Oak Brook, Ill.

[21] Appl. No.: 305,882

[22] Filed: Sep. 28, 1981

[51] Int. Cl.³ .............................................. B01D 47/00
[52] U.S. Cl. ............................................ 55/85; 55/89; 210/708; 252/330
[58] Field of Search ................... 55/84, 85, 89, 45; 252/312, 330; 210/708

[56] References Cited

U.S. PATENT DOCUMENTS

| | | | |
|---|---|---|---|
| 1,686,491 | 10/1928 | Hughes et al. | 252/330 |
| 1,872,617 | 8/1932 | Brown | 252/312 |
| 3,419,494 | 12/1968 | Teeter et al. | 252/312 |
| 3,943,954 | 3/1976 | Flournoy et al. | 252/312 |
| 4,102,303 | 7/1978 | Cordier et al. | 55/85 |
| 4,220,456 | 9/1980 | Block | 55/85 |
| 4,261,707 | 4/1981 | Bradshaw et al. | 55/85 |
| 4,265,642 | 5/1981 | Mir et al. | 55/85 |
| 4,339,248 | 7/1982 | Garner . | |

FOREIGN PATENT DOCUMENTS

| | | | |
|---|---|---|---|
| 2511181 | 9/1976 | Fed. Rep. of Germany | 55/90 |
| 49-52990 | 5/1974 | Japan . | |
| 51-41677 | 4/1976 | Japan | 55/84 |

*Primary Examiner*—Bernard Nozick
*Attorney, Agent, or Firm*—John G. Premo; Robert A. Miller; Donald G. Epple

[57] ABSTRACT

A method for continuously removing volatile organic solvent paint carriers from the atmosphere of paint spray booths is disclosed. By the process described, an oil-water emulsion is used to scrub volatile organic materials from the paint spray booth atmosphere. The emulsion is then broken and the oil phase is distilled to recover volatile components. The non-volatile components of the oil phase and recovered water are then recombined to form an emulsion and recycled to the paint spray booth.

2 Claims, 1 Drawing Figure

PAINT SPRAY BOOTH EMISSIONS CONTROL PROCESS

INTRODUCTION

This invention is directed to a process for recovering volatile organic solvents present in paints from the atmosphere of paint spray booths.

In paint spray booths, substantial quantities of air are used to clean the booth of paint particles, volatile organic paint carriers, and the like. This airstream picks up substantial quantities of volatile organic paint carrier vapors which are then generally discharged into the atmosphere. Discharge into the atmosphere of the airstream containing volatile organic solvent vapors presents an environmental problem, as well as a serious economic problem, in that valuable hydrocarbon solvents are lost. While the airstream in paint spray booths has been conventionally washed with water, the water acts as a poor solvent for the volatile organic materials and performs inadequately in containing these materials. While particulate matter in the form of over sprayed paint solids are trapped by the water, the paint solids tend to hold their associated solvent or carrier, and again, during filtration or the like to recover the paint solids, organic solvent vapors are dissipated into the atmosphere.

Typical spray booths operate by passing large volumes of air downward through the spray booth and over the object being painted. The airstream is then, after it has picked up solvent, paint particles, etc., washed with water, the water generally being in a below floor level sump in the spray booth. The water in the sump collects over sprayed paint and solvent materials and the resultant washed air is discharged into the atmosphere.

The modification of existing paint spray booth systems to eliminate discharge of volatilized solvents into the atmosphere would be expensive, and possibly prohibitive, by state of the art techniques such as carbon adsorption, incineration, and the like. Accordingly, for economic reasons, modifications must be developed which will avoid the expulsion of volatile organic molecules into the atmosphere. It has been discovered that by the use of certain oil-in-water emulsions that can be used in place of the water in paint spray booths, substantial quantities of solvent from paint spray booths can be recovered.

The process of this invention can generally be described by the following steps of:

A. forming an oil-in-water emulsion of water and a high-boiling organic liquid in which the volatile organic paint solvent is soluble;

B. contacting the emulsion with solvent-laden air from the paint spray booth;

C. continuously withdrawing at least a portion of said emulsion from the paint spray booth;

D. breaking the portion of emulsion withdrawn from the paint spray booth and recovering a solvent-rich, high-boiling organic liquid phase and a water phase;

E. distilling solvent-rich, high-boiling organic liquid phase to recover volatile organic paint solvent therefrom and to recover high-boiling organic liquid;

F. combining the water phase of step D with the recovered high-boiling organic liquid of step E to reform an oil-in-water emulsion; and then, G. repeating steps B–F above.

Optionally, paint solids in the emulsion may be removed from the emulsion after step C and prior to step D above.

It is, therefore, an object of this invention to provide a process which is readily adaptable to existing paint spray booths which will enable recovery of volatile organic materials used as paint carriers.

Further objects will appear here and after.

BRIEF DESCRIPTION OF THE DRAWINGS

The drawing shows a schematic view of a process for recovering volatile organic materials from gas scrubber systems, and more particularly, from paint spray booths.

DETAILED DESCRIPTION OF THE DRAWINGS

Figure 1:
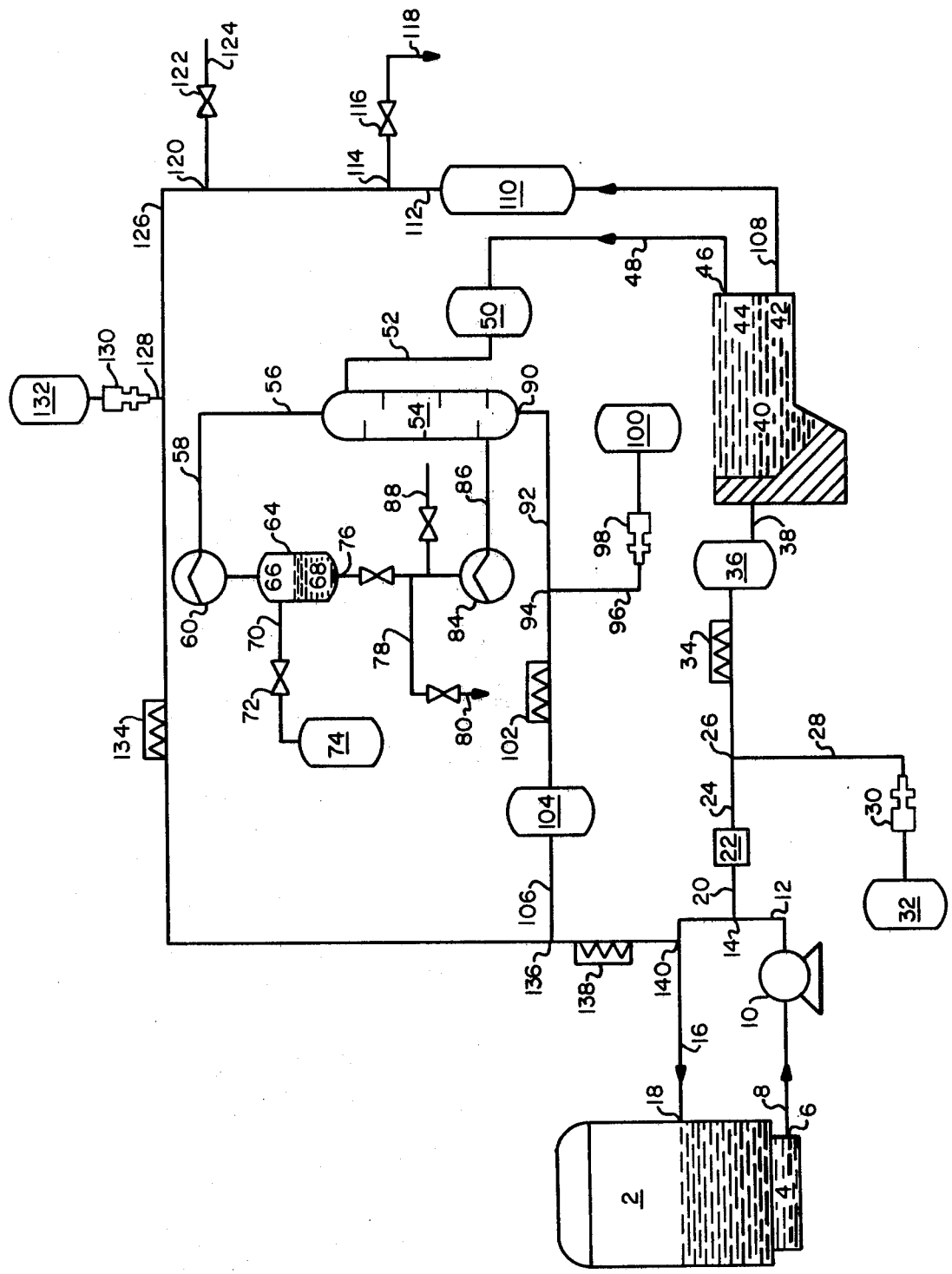

With reference to the FIGURE, paint spray booth 2 may be of any type equipped to wash paint solids and volatile organic paint carriers such as, but not limited to, toluene, methyl ethyl ketone, methyl amyl ketone, heptane, butyl acetate, naptha, ethylene glycol monoethyl ether acetate, etc., from the air in the booth using a scrubbing liquid. Paint spray booth 2 is equipped with a recirculating system including liquid outlet 6 connected to and then into line 16, into inlet 18 and back into paint spray booth 2.

In a preferred aspect of this invention, scrubbing liquid is an oil-in-water emulsion designated by the numeral 4. The emulsions employed are oil-in-water emulsions similar to those disclosures in U.S. Pat. Nos. 4,261,707 and 4,265,642, as well as Japanese Kokai No. 52990-76. Preferred emulsions are prepared using certain organic hydrocarbon oils and water using fatty acids as emulsifiers.

In the recovery of volatile organic paint carriers from emulsion 4, a portion of the emulsion, but less than one-half of the total volume passing through line 12, is diverted into "T" 14 and into line 20. Emulsion entering line 20 normally contains volatile organic paint carriers, water, hydrocarbon oil, emulsifier, and paint particles. Line 20, accordingly, may be fitted with optional filter 22 to remove paint particles. If used, filter 22 is generally of a bag type although other types of filters may be employed. If no filter is employed, paint particles remain dispersed in emulsion 4.

Filter 22 empties into line 24 where at point 26, chemical means for breaking emulsion is added from tank 32 connected to pump 30 and line 28. Pump 30 is typically of a metering type so that controlled amounts of emulsion breaker may be added.

After point 26, emulsion is thoroughly mixed with emulsion breaker by mixer 34 and flows into agitated tank 36 where emulsion breaks. Unstable emulsion flows through line 38 into oil/water separating unit 40 forming an upper volatile organic paint carrier rich hydrocarbon liquid layer 44 and a lower volatile organic paint carrier lean aqueous phase 42. Separator 40 can be of any number of commercially manufactured units and may or may not have packed plates as shown in the drawing. Separator 40 can also simply be a large tank with suitable inlets and outlets to withdraw respective phases. If filter 22 is not utilized, paint solids may be recovered from the organic layer by filter means in line 48.

In the operation of the system volatile organic paint carrier rich hydrocarbon oil exits separator 40 at exit 46 and flows through line 48 into holding tank 50. From tank 50, volatile organic paint carrier rich hydrocarbon oil enters line 52 and travels to distillation column and, preferably, steam stripper 54. In steam stripper volatile organic paint carrier and any water is removed overhead, passing through top of stripper 56 and into line 58. Heat exchanger 60 in line 58 condenses volatile organic paint carrier and water which flow into tank 64, forming upper volatile organic paint carrier phase 66 and lower aqueous phase 68.

Volatile organic paint carrier 66 is recovered via line 70, passing through valve 72 and into tank 74 where volatile organic paint carrier is recovered. Lower aqueous phase 68 passes out of tank 64 through point 76 and, as desired, may be recirculated to heat exchanger 84 and back to steam stripper 54 via line 86, or, alternatively, may be routed by line 78 to a waste treatment system or sewer not shown. Fresh water inlet 88 is shown for use in the case of steam stripping. It will also be apparent that plant steam may be substituted with the corresponding elimination of heat exchanger 84.

Hydrocarbon oil, now separated from volatile organic paint carrier, and being solvent lean, is of a high boiling nature and does not distill. Accordingly, this fluid drains from bottom of column 54 through point 90 and into line 92 where it contacts "T" 94 at which point oil-soluble chemical means for reforming emulsion is added through line 96, pump 98 and tank 100. Pump 98 again is typically of a metering type so as to carefully control emulsifier addition to point 94.

Hydrocarbon oil is mixed with emulsifier at mixer 102 and is stored in tank 104. From tank 104, hydrocarbon oil and emulsifier travel along line 106 to point 136.

Referring back to separator 40, lower volatile organic paint carrier lean aqueous phase 42 exits separator through line 108 and enters optional coalescing or sand filter 110 where additional hydrocarbon liquid is removed. Exiting filter 110, water travels along line 112 where at point 114 a drain or blowdown point is provided to discharge water to sewer or waste treatment system not shown through valve 116 and line 118. Water makeup is provided at point 120 on line 112 where fresh water from source not shown can be added through valve 122 and line 124. Line 112 passes into line 126 where at point 128 is provided an addition point for water-soluble chemical means for forming emulsion through pump 130 and tank 132. Pump 130 is preferably a metering pump to carefully control addition of water-soluble emulsifying means. Line 126 then passes into mixer 134 where water is thoroughly mixed with water-soluble emulsifying means. Mixed water and emulsifying means then passes through point 136 where it is combined with hydrocarbon oil containing oil-soluble emulsifying means. Emulsion 4 is reformed in mixer 138 from which it reaches point 140 and re-enters paint spray booth 2 circulating system through line 16.

As will be seen by those skilled in the art, variations and permutations of the above described process can be employed without deviating from the spirit and intent of this invention. As an example, an optional coalescing filter 110 may be employed in line 108 to remove oil and solvent droplets present in the water which is later recycled; likewise, recovered oil-containing emulsifier from holding tank 104 can be mixed with emulsion withdrawn from paint spray booth 2 and then returned to 2 with fresh water being added directly to the booth.

Another possible variation in this invention is to use fresh water or a high pressure steam source for steam in column 54.

As seen from the drawing, certain points have been included where both oil and water-soluble chemical emulsifying agents may be added. In the preferred embodiment of this invention, the oil-in-water emulsions are pH sensitive, forming at alkaline pH values and breaking at acidic pH values. Accordingly, both tanks 32 and 132 will hold pH adjustment aids. Tank 32 will generally hold an aqueous acid, and tank 132 will hold and aqueous alkalinity adjustment agent. As an example, emulsions may be formed at alkaline pH values of from about 7.5–12 and may be broken at acidic pH values of from about 3.0 to approximately 6.5 utilizing the preferred oil-soluble fatty acid and emulsifier system. If other emulsifier systems are used, these additives may not be necessary; and hence, point 128 and connected structure to tank 132 will not be necessary.

It will be seen that none of these changes and others which can be contemplated by those skilled in the art depart from the basic scheme of this invention, a continuous method for recovering volatile paint solvents from paint spray booths using a recyclable oil-in-water emulsion.

Having thus described this invention, it is claimed as follows:

1. A method for the continuous removal of volatile organic paint solvents from an oil-in-water emulsion used as the wash water in a paint spray booth which comprises the steps of:
    (a) forming an oil-in-water emulsion of water and a high boiling organic liquid in which the volatile organic paint solvent is soluble at a pH of 7.5–12,
    (b) contacting the oil-in-water emulsion of step (a) with solvent laden air from the paint spray booth;
    (c) continuously withdrawing at least a portion of the emulsion from a sump after it has contacted the paint solvent and oversprayed paint laden air in the paint spray booth;
    (d) separating by chemical means at a pH of 3.0–6.5 the portion of emulsion withdrawn from the paint spray booth sump to recover a solvent-rich, high-boiling organic liquid phase containing the paint solvent and a water phase;
    (e) distilling the paint solvent from the high boiling organic liquid to recover the volatile organic paint solvent and a high boiling organic liquid;
    (f) combining the water phase of step (d) with the recovered high boiling organic liquid of step (e) and chemically reforming an oil-in-water emulsion; and then,
    (g) repeating steps (b) to (f) above.

2. The method of claim 1 wherein subsequent to contacting the oil-in-water emulsion with the solvent and oversprayed paint in the paint laden air spray booth and prior to separating said emulsion into a solvent-rich high-boiling organic liquid phase and a water phase, the paint solids are separated from the emulsion.

* * * * *